(12) United States Patent
Leach et al.

(10) Patent No.: US 10,816,499 B2
(45) Date of Patent: Oct. 27, 2020

(54) ELECTROCHEMICAL TEST DEVICE

(71) Applicant: Inside Biometrics Limited, Dingwall (GB)

(72) Inventors: Christopher Philip Leach, Dingwall (GB); James Iain Rodgers, Dingwall (GB)

(73) Assignee: INSIDE BIOMETRICS INTERNATIONAL LIMITED, Dingwall (GB)

( * ) Notice: Subject to any disclaimer, the term of this patent is extended or adjusted under 35 U.S.C. 154(b) by 238 days.

(21) Appl. No.: 15/777,789

(22) PCT Filed: Nov. 23, 2016

(86) PCT No.: PCT/GB2016/053680
§ 371 (c)(1),
(2) Date: May 21, 2018

(87) PCT Pub. No.: WO2017/089798
PCT Pub. Date: Jun. 1, 2017

(65) Prior Publication Data
US 2018/0372668 A1      Dec. 27, 2018

(30) Foreign Application Priority Data
Nov. 23, 2015   (GB) .................................. 1520660.0

(51) Int. Cl.
*G01N 27/327* (2006.01)
*G01N 27/30* (2006.01)

(52) U.S. Cl.
CPC ....... *G01N 27/3272* (2013.01); *G01N 27/308* (2013.01)

(58) Field of Classification Search
CPC ..................... G01N 27/327; G01N 27/3272
See application file for complete search history.

(56) References Cited

U.S. PATENT DOCUMENTS

| 3,979,274 | A   |   | 9/1976  | Newman |
|-----------|-----|---|---------|--------|
| 5,830,680 | A   |   | 11/1998 | Meyerhoff et al. |
| 6,478,938 | B1  | * | 11/2002 | Paek ........................ C12Q 1/002 204/403.01 |
| 10,408,828| B2  | * | 9/2019  | Anderberg ............ B01L 3/5023 |

(Continued)

FOREIGN PATENT DOCUMENTS

| EP | 0289269 A1 | 11/1988 |
| EP | 0421234 A2 * | 10/1991 ........... G01N 33/543 |
| EP | 2187203 A1 | 5/2010 |

(Continued)

OTHER PUBLICATIONS

Ahmad et al., "Morphological and Thermal-Mechanical Stretching Properties on Polymeric Lateral Flow Nitrocellulose Membrane," Ind. Eng. Chem. Res. 2009, 48, 3417-3424 (Year: 2009).*

(Continued)

*Primary Examiner* — Alexander S Noguerola
(74) *Attorney, Agent, or Firm* — Tarolli, Sundheim, Covell & Tummino LLP

(57) ABSTRACT

An electrochemical test device for determining the concentration of an analyte in a fluid sample, wherein the electrochemical test device has a substrate is provided. The device comprises a micro-voided synthetic polymer.

18 Claims, 7 Drawing Sheets

(56) References Cited

U.S. PATENT DOCUMENTS

2008/0238086 A1    10/2008   Geuens et al.
2014/0174947 A1     6/2014   Moffat et al.

FOREIGN PATENT DOCUMENTS

WO       02/097416 A1    12/2002
WO    2005/008232 A1     1/2005

OTHER PUBLICATIONS

Explanation of Resistance and Ressitivity downloaded from http://hyperphysics.phy-astr.gsu.edu/hbase/electric/resis.html on Mar. 11, 2020 (Year: 2020).*
International Search Report and Written Opinion dated Feb. 20, 2017 for corresponding International Patent Application No. PCT/GB2016/053680.
GB Search Report dated Sep. 6, 2016 for corresponding GB application No. GB1520660.0.

* cited by examiner

ELECTROCHEMICAL TEST DEVICE

RELATED APPLICATIONS

The present application is a U.S. National Stage application under 35 USC 371 of PCT Application Ser. No. PCT/GB2016/053680, filed on 23 Nov. 2016; which claims priority from GB Patent Application No. 1520660.0, filed 23 Nov. 2015, the entirety of both of which are incorporated herein by reference.

TECHNICAL FIELD

The present invention relates to electrochemical test devices such as test strips for determining the concentration of an analyte in a fluid sample. The present invention also relates to a method of manufacturing an electrochemical test device.

BACKGROUND

In the field of diagnostic devices as used in the medical device industry, especially those used for analysing blood or other bodily fluid samples, it is often required for users to monitor biometrics such as the levels of certain chemicals, substances, or analytes present for example in their bloodstream. For instance diabetics in particular must regularly monitor the concentrations of glucose in their blood in order to determine if they are in need of insulin or sugar. In order to respond effectively to an individual's need to monitor blood sugar levels, diagnostic devices and kits have been developed over the years to allow an individual to autonomously determine the concentration of glucose in their bloodstream, in order to better anticipate the onset of hyperglycaemia or hypoglycaemia and take preventative action as necessary.

Typically the patient will, using a lancing device, perform a finger stick to extract a small drop of blood from a finger or alternative site. An electrochemical test device, which is often a test strip, is then inserted into a diagnostic meter, and the sample is applied to the test strip. Through capillary action, the sample flows through a capillary channel across a measurement chamber of the device and into contact with one or more electrodes or similar conductive elements coated with sensing chemistry for interacting with a particular analyte or other specific chemical (for example glucose) in the blood sample. The magnitude of the reaction is dependent on the concentration of the analyte in the blood sample. The diagnostic meter may detect the current generated by the reaction of the reagent with the analyte, and the result can be displayed to the user.

Typically, such electrochemical test devices have a set of electrodes such as a counter/reference electrode and one or more working electrodes. Sensing chemistry is used which is typically tailored to the particular analyte of interest. For example, when measuring the concentration of glucose in a sample, a glucose oxidase or a glucose dehydrogenase enzyme can be used in conjunction with a mediator such as potassium ferricyanide. The skilled person will understand that different electrochemical test devices, electrode arrangements and sensing chemistry may be used.

Electrochemical test devices typically comprise conductive tracks printed using polymer thick film (PTF) inks onto a substrate or support layer. Known substrate materials include glass and ceramics, which typically remain structurally stable up to temperatures in excess of 1000° C. Accordingly, glass and ceramics remain structurally stable at temperatures above the temperatures (typically in the range of 70° C. to 300° C.) required to evaporate organic solvents in the printing inks during the printing/drying process. However, these "high temperature" substrates such as glass or ceramic are too expensive and unsuitable for large scale manufacture of low-cost electrochemical test devices (for example, they are difficult to cut and may leave dangerous edges).

Often, "low temperature" substrates (formed of materials which may begin to deform or degrade at a temperature below the boiling point of organic solvents in the inks) are used. During manufacture of an electrochemical test device, care must therefore be taken in ensuring that the ink solvents are dried whilst keeping the substrate cool enough to preserve its structural integrity, and the exact drying conditions become critical to the quality of the final electrochemical test device. Examples of low temperature substrates include papers and boards made from cellulosic fibres/pulping processes, which are very cheap and widely available, but can be very variable in composition and nature, and tend to be highly absorbent (not adequately water resistant) and too inconsistent in both manufacture and use to give the high levels of performance and reproducibility necessary to make the best quality electrochemical test devices.

Conventionally, extruded polymer films, for example, polybutylene terephthalate (PBT) or polyethylene terephthalate (PET) are therefore widely used instead of either high temperature substrates, such as ceramic or glass, or pulp fibre based substrates, such as paper or boards. These polymer films are not water absorbent, they are easy to process (cut) in subsequent manufacturing steps, and they have only moderate material costs. However these polymer film substrates still have their limitations.

The present invention seeks to provide an improved electrochemical test device.

SUMMARY

An electrochemical test device for determining the concentration of an analyte in a fluid sample is provided. The electrochemical test device has a substrate comprising a micro-voided synthetic polymer.

A micro-voided synthetic polymer is a synthetic polymer having microcells, voids, cavities, pores, bubbles or cellulation for example. Such voids or micro-voids may be formed for example during stretching of an oriented polymer film as the result of void-initiating particles that are immiscible with the synthetic polymer e.g. polyester synthetic polymer matrix, or by other thermally initiated chemical or physical reactions occurring within the polymer melt during the extrusion process. The voids or micro-voids may be unfilled or filled with air or a vapour. Such voids will typically be in the range of 0.01-100 μm, more preferably in the range 0.1-50 μm.

Conventionally, extruded polymer films such as polybutylene terephthalate (PBT) or polyethylene terephthalate (PET) have been widely used as substrates for electrochemical test devices due to the fact such extruded polymer films are easy to process (for example, to cut) and use in manufacture, and are inexpensive. Such substrates provide a suitable support or backbone for other layers of electrochemical test devices and this has been seen as their primary or sole function. Accordingly, there has been little to no incentive for manufacturers of electrochemical test devices to research other substrates, especially into materials that may be considered as comparatively lightweight or flimsy such as paper.

The inventors have recognised that, as well as providing support for a conductor layer and other layers of an electrochemical test device, a substrate can have demonstrable effects on the accuracy and precision of any measurements made with the electrochemical test device. In particular, the inventors have recognised that an electrochemical test device having a substrate comprising a micro-voided synthetic polymer is advantageous for both technical and commercial reasons.

Advantageously, by providing a substrate comprising a micro-voided synthetic polymer the amount of polymer put into waste streams is reduced whilst still providing the required mechanical strength (for supporting further layers of the electrochemical test device and withstanding forces during manufacture) and substrate mass. For example, a substrate comprising a micro-voided synthetic polymer may have around 15% less mass than a conventional PET substrate of the same thickness, and yet still have the required mechanical strength to support the other layers of the electrochemical test device and to withstand the sometimes considerable tensions created by the shrinkage of applied ink layers during drying in the manufacturing process. The micro-voids behave somewhat like a "honeycomb" structure meaning that even though there is less polymer mass present across a given substrate thickness, the substrate suffers little or no detriment in mechanical properties over a comparable dense polymer film of the same thickness.

Furthermore, the micro-voids may be compressible and so can act as an internal shock absorber, providing a mechanism whereby internal stresses within the substrate may be relieved. In a conventional extruded dense polyester film, the film is fixed under high stress as the molecules are aligned in a thermodynamically unfavourable conformation within the extrusion process. Subsequent heating enables this tension to be released as the polymer chains "remember" their thermodynamically preferred unconstrained shape. Upon release, this stress tension has nowhere to go except for along the entire dimension of the substrate film. Heating these dense films close to their softening points therefore causes severe buckling and warping across the full macroscopic dimension of the polymer substrate. However, in a substrate comprising a micro-voided synthetic polymer, the voids give those polymer molecules space in which the tensions can be relieved locally such that there is less propensity for tension to be propagated along the entire dimension of the substrate film, making the substrate less likely to buckle when heated. The micro-voids thereby confer improved thermomechanical properties and dimensional stability, by allowing internal stresses to be relieved at a microscopic, rather than at a macroscopic level.

Further advantageously, and as will be demonstrated below, in manufacture lower dryer temperatures are required to dry conductive inks applied to a micro-voided synthetic polymer than are required to dry conductive inks applied to a conventional PET substrate. Accordingly, less energy is required during the manufacture of an electrochemical test device and the substrate is less likely to suffer from thermal deformation.

When using a substrate comprising a micro-voided synthetic polymer, the substrate absorbs less of the available heat output by the dryer, in coming up to temperature for a given dryer setpoint condition than a corresponding substrate formed of polyethylene terephthalate (PET). Hence a conductor layer (comprising one or more electrodes) deposited on a substrate comprising micro-voided synthetic polymer can be dried more readily, and with less commensurate substrate dimensional change, relative to the amount of solvent that is correspondingly evaporated from the ink. The physical and thermal properties of the micro-voided synthetic polymer are such that more of the supplied heat gets desirably expended in evaporating the ink solvents as intended, and correspondingly less of the available heat gets expended in undesirably altering the substrates internal molecular structure instead. By providing an electrochemical test device having a substrate comprising a micro-voided synthetic polymer, problems affecting sensor variability such as fractionally complete drying or heat damage, may be mitigated, and better print definition (for example, electrode definition) may be achieved.

Further advantageously, a substrate comprising a micro-voided synthetic polymer can provide a better print receptive surface onto which conductive inks may be applied and may be less prone to electrostatic build up. Conversely, extruded polymer films are prone to electrostatic build up and so, in some circumstances, tribocharging effects can lead to unintended repulsion of coating materials away from intended image areas, and unintended attraction of coating material towards intended non image areas.

Substrate materials having micro-voided synthetic polymers are additionally often cheaper than polyester, may be available in biodegradable forms, and are often recyclable. Substrates comprising micro-voided synthetic polymers are also easier to process and convert eg cutting to size during manufacture, than a polyester substrate, making such micro-voided substrates better for processing by reducing wear on cutting equipment.

Further embodiments of the invention will be made clear from the further optional features below.

The micro-voided synthetic polymer may comprise a polyester polymer. The micro-voided synthetic polymer may further comprise an acrylic, such as styrene-acrylonitrile (SAN). The polyester polymer may comprise a polyester/SAN polymer combination. The polyester/SAN polymer combination may comprise a continuous phase of linear polyester matrix with non-cross-linked random SAN polymer molecules dispersed therein.

The micro-voided synthetic polymer may be a micro-voided axially stretched polymer film. The micro-voided synthetic polymer may be a micro-voided bi-axially stretched polymer film.

The substrate may comprise an opacifying pigment. An opacifying pigment may comprise one of silica, zinc oxide, zinc sulfide, lithopone, barium sulfate, calcium carbonate, titanium dioxide, aluminium phosphate, clay minerals (bentonites, china clays) talc and/or alumina. The opacifying pigment may be a porous pigment. Other opacifying pigments may be used.

The substrate may comprise print receiving chemistry. The print receiving chemistry may be provided as a layer, for example as one or more porous receiving layers or subbing layers. Print receiving layers or subbing layers may comprise one or more of silica, binder (for example ammonium salt of styrene acrylate (SA) polymer or other anionic latex, surfactant and mordant. Print receiving layers or subbing layers may comprise one or more of casein, polyacrylates, styrene butadienes, china clay, barium sulfate, chalk or titania. The print receiving layer may comprise one or more clays, clay coatings, silicas (for example Aerosil pigment) or silicates. Either or both of a subbing layer and a print receiving layer may be present. A subbing layer may act as a print receptive coating itself, or it may be used to provide a basis upon which a specific print receptive coating is then coated. Sometimes the subbing layer is just a dilute coating of the subsequent coating layer, the impact of which is to improve the interaction between substrate and coating.

The substrate may be at least partially hydrophobic.

The substrate may further comprise an electroconductivity enhancing component. The electroconductivity enhancing component may comprise a non-dielectric pigment.

The substrate may comprise at least one antistatic agent. Any conductive or semiconductive material, or electrolyte material, can act as an antistatic component. Examples of antistatic agents include polythiophenes, glycerol monstearate, mono and diglycerides of fatty acids, amide waxes, and tallow. A carboxylic antistatic agent may be used. The at least one antistatic agent may be provided as a layer.

An advantage of providing an electrochemical test device having a substrate comprising a micro-voided synthetic polymer is that the precision of the electrochemical test device is improved over electrochemical test devices having conventional polymer substrates. In this regard it is beneficial that an output signal produced does not vary greatly from one electrochemical test device to another. The test devices may have a coefficient of variance of less than 2% and preferably less than 1.2%. For example, when testing the device, a measurement of an output signal, such as a transient current measurement, may have a coefficient of variation of less than 2% and preferably less than 1.2% for test devices from the same batch.

The substrate may have a surface roughness of less than 2 µm, preferably between 0.5 and 1.5 µm and more preferably between 0.8 and 1.2 µm.

The substrate may have a surface resistivity (as measured at 500V according to BS6524(1984) standard) in the range of $5 \times 10^5 \Omega$ to $5 \times 10^{11} \Omega$. Preferably, the substrate may have a surface resistivity of between $5 \times 10^8 \Omega$ and $5 \times 10^{10} \Omega$. The substrate may have a topside surface resistivity in the range of $6 \times 10^9 \Omega$ to $10 \times 10^9 \Omega$.

The substrate may have a topside water drop contact angle of between 74 and 82 degrees. For example, the substrate may have a topside water drop contact angle of between 76 and 80 degrees.

The substrate may be thermally stable when exposed to air at a temperature of around 210° C.

The electrochemical test device may comprise a set of electrodes including a working electrode for the analyte and sensing chemistry for the working electrode. The sensing chemistry—which may be one or more reagents—is typically tailored to the particular analyte of interest.

An electrochemical test device may be a coplanar electrochemical test device. The electrochemical test device may comprise a conductor layer above the substrate, the conductor layer comprising a set of electrodes. The electrochemical test device may further comprise a spacer layer above the conductor layer. The spacer layer may define a sample introduction channel for introducing a fluid sample to the set of electrodes. The electrochemical test device may further comprise a cover above the spacer layer for covering the top of the sample introduction channel.

An electrochemical test device may be a cofacial electrochemical test device. The electrochemical test device may comprise a conductor layer above the substrate, the conductor layer comprising at least one electrode. The electrochemical test device may further comprise a spacer layer above the conductor layer. The electrochemical test device may further comprise a second conductor layer above the spacer layer, the second conductor layer comprising at least one electrode. The spacer layer may define a sample introduction channel for introducing the fluid sample to the at least one electrode of the conductor layer and to the at least one electrode of the second conductor layer. The electrochemical test device may further comprise a cover layer above the second conductor layer. The cover layer may be a substrate. The substrate may comprise a micro-voided synthetic polymer.

The conductor layer may comprise a polymer thick film, PTF, ink.

The electrochemical test device may further comprise an insulator layer. The insulator layer may be provided above the conductor layer. The insulator layer may be provided below the spacer layer. The insulator layer may define an area in which at least part of the set of electrodes is exposed to the sample introduction channel. The insulator layer may comprise a polymer thick film, PTF, ink.

According to an aspect of the present invention, a method of manufacturing an electrochemical test device for determining the concentration of an analyte in a fluid sample is provided. The method comprises using a micro-voided polymer as described above as the substrate of the electrochemical test device.

The method may further comprise providing a conductor layer above the substrate to form at least one electrode of the electrochemical test device.

The conductor layer may be a carbon containing layer and the providing the conductor layer may comprise depositing a carbon containing layer on the substrate to form the set of electrodes. The depositing of the carbon containing layer may comprise printing the carbon containing layer. The carbon containing layer may comprise carbon ink.

The method may further comprise drying the deposited carbon containing layer using forced air at a temperature of between 170° C. and 210° C. In particular, the method may comprise drying the deposited carbon containing layer with forced air at a temperature of between 175° C. and 185° C.

The drying of the carbon containing layer may be performed for at least 2 minutes.

The method may further comprise providing an insulation layer above the conductor layer.

The method may comprise providing a spacer layer above the conductor layer. The method may comprise providing a cover above the spacer layer.

The method may comprise providing a spacer layer above the conductor layer. The method may comprise providing a second conductor layer above the spacer layer, the second conductor layer comprising at least one electrode. The method may further comprise providing a cover layer above the second conductor layer. The cover layer may be a substrate. The substrate may comprise a micro-voided synthetic polymer.

Other aspects and features of the present invention will be appreciated from the following description and the accompanying claims.

BRIEF DESCRIPTION OF THE DRAWINGS

Embodiments of the invention shall now be described, by way of example only, with reference to the drawings in which.

Throughout the description and the drawings, like reference numerals refer to like parts.

DETAILED DESCRIPTION

The present invention seeks to provide an improved electrochemical test device for determining a concentration of an analyte in a fluid sample. Whilst various embodiments of the invention are described below, the invention is not limited to these embodiments, and variations of these embodiments may be made without departing from the scope of the invention.

Throughout this specification, reference is made to directional terms such as "above" and "below", or "upper" and "lower". References made to such terms are purely indicative of relative positions of the features of embodiments disclosed herein. For example, wherever there is mention of a cover above a spacer layer and an insulator layer below the spacer layer, it should be understood that the cover and the insulator layer are formed on opposite sides of the spacer layer. That is, directional terms such as those described herein do not refer to a direction relative to a viewpoint of an observer, but instead should be considered in all aspects as relative terms.

Figure 1:
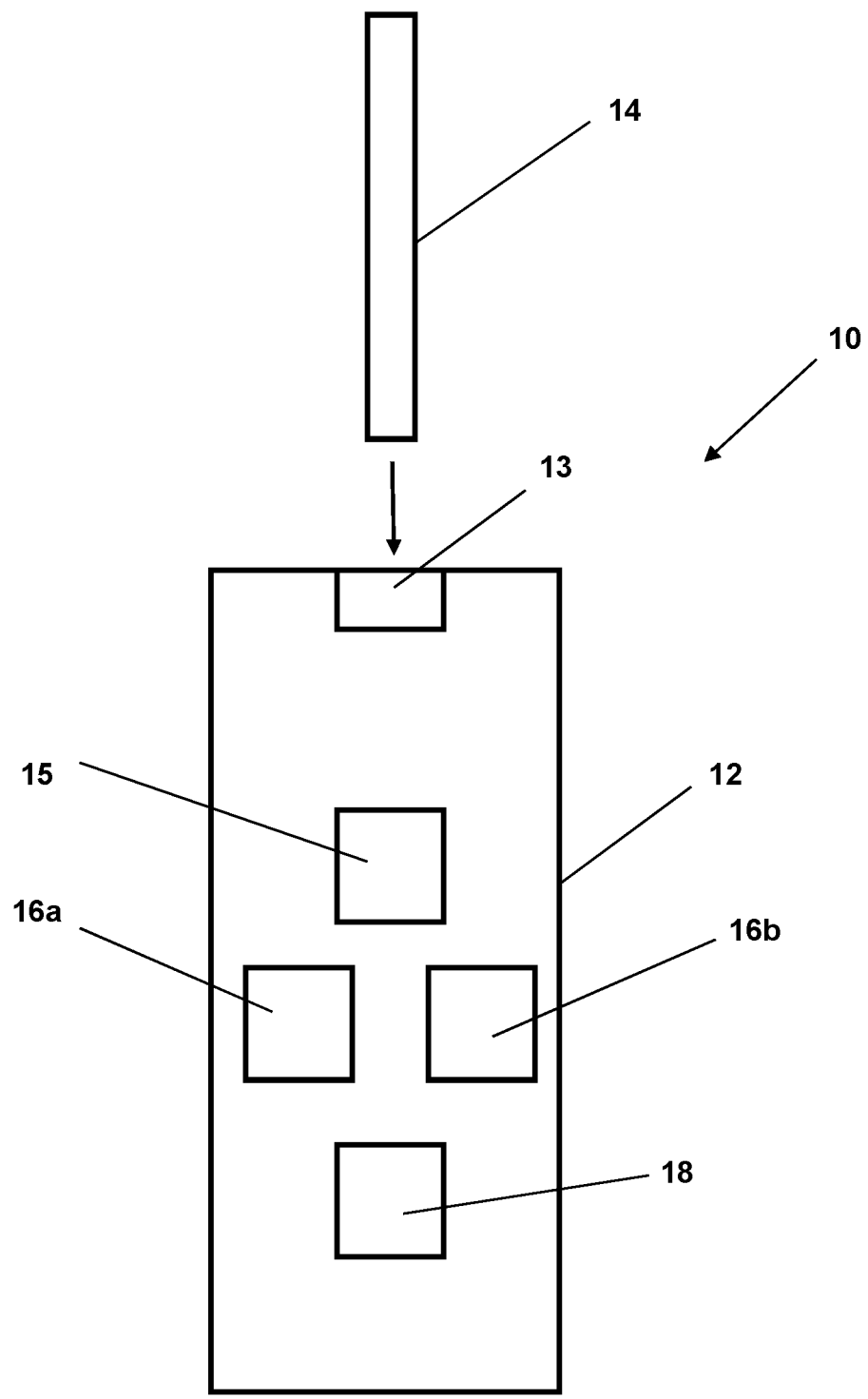
FIG. 1 shows a strip-meter system.

FIG. 1 shows an apparatus in the form of a test strip-meter system 10. System 10 comprises a meter 12 for receiving an output signal from an electrochemical test device such as electrochemical test strip 14. Electrochemical test strip 14 comprises a set of electrodes which typically comprises one or more working electrodes (not shown in FIG. 1) and a counter/reference electrode, each of the working electrodes provided with sensing chemistry for reacting with at least one analyte of a fluid sample to be applied to electrochemical test strip 14. In this example, each of the one or more working electrodes has reagents coated thereon. The counter/reference electrode may also have reagents coated thereon. Meter 12 comprises receiving means 13 for receiving electrochemical test strip 14 and applying a potential difference to the working electrode(s) and the counter/reference electrode.

Meter 12 further comprises processing circuitry 15 for carrying out various functions relating to the operation of meter 12. For example, processing circuitry 15 is configured to control operation of receiving means 13 so as to control application of a potential difference between the working electrode(s) and the counter/reference electrode. Processing circuitry 15 is further configured to process one or more output signals generated at test strip 14 and to control a display of messages on display 18. The processing circuitry may perform other functions. Meter 12 further comprises first and second memory storages 16a and 16b. Although two memory storages are shown, in other embodiments the memory storages may be combined to form a single memory storage, or meter 12 may comprise more than two memory storages. Meter 12 also comprises a display 18 for displaying readouts of measurements taken by meter 12.

When manufacturing an electrochemical test device such as electrochemical test strip 14 the device can be constructed in layers with different layers providing different features such as conductive tracks, electrode area definition and positioning of chemistry. Suitable manufacturing techniques may be used such as deposition techniques (e.g. printing such as thick-film printing methods including screen printing, rotary printing, serigraph printing, gravure printing and sub-microlitre controlled volume drop on demand printing technologies) and adherence of layers, as will be apparent from the following.

Figure 2:
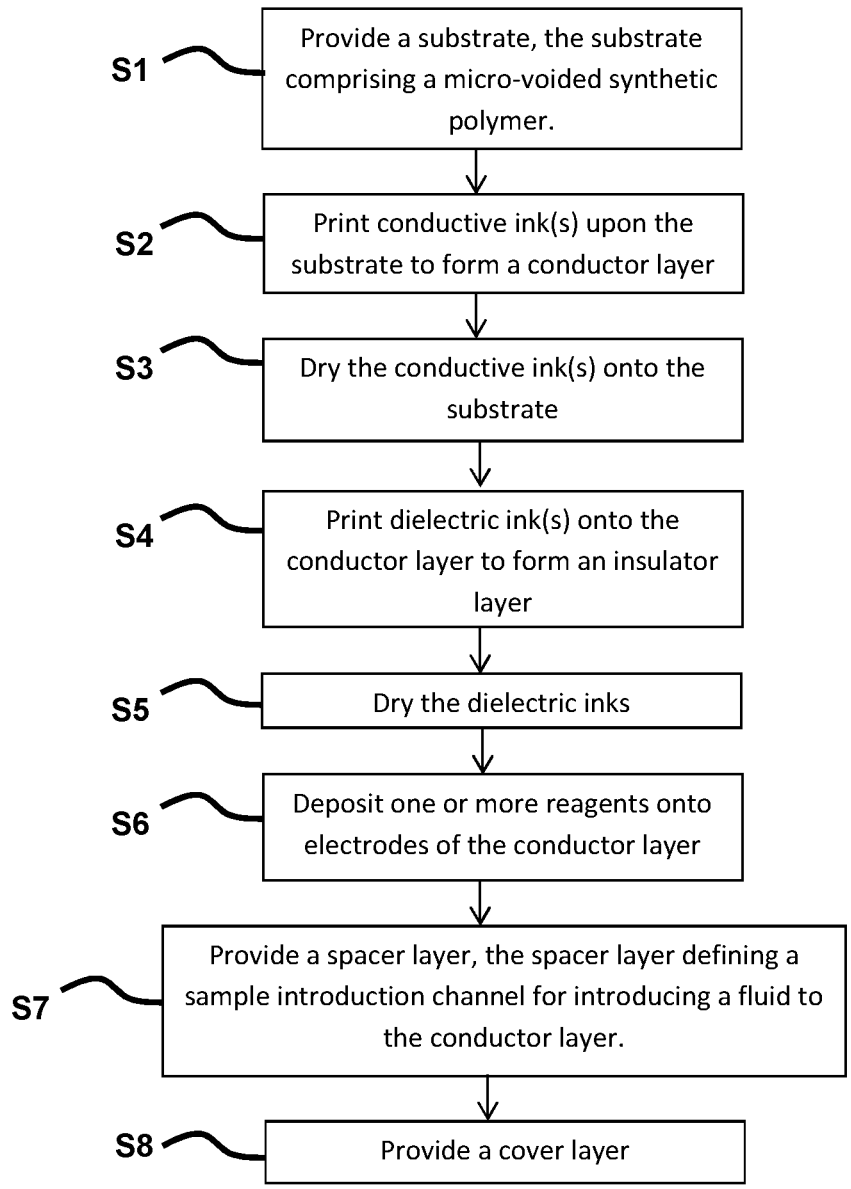
FIG. 2 is a flow chart of a high level method for manufacturing an electrochemical test device having a substrate comprising a micro-voided synthetic polymer.

FIG. 2 is a flowchart showing a method of manufacturing an electrochemical test device. At step S1 a substrate is provided, wherein the substrate comprises a micro-voided synthetic polymer. At step S2, conductive ink(s) are printed upon the substrate. At step S3 the substrate with the conductive ink(s) is placed in a dryer and dried until a dry conductor layer is formed, the conductor layer comprising one or more electrodes. At step S4, dielectric inks are printed upon the substrate. At step S5, the dielectric ink(s) are dried, forming an insulator layer for defining electrode interaction areas. At step S6, one or more reagents are deposited onto the electrodes of the conductor layer. At step S7 a spacer layer is provided, the spacer layer defining a sample introduction channel, or measurement chamber, for introducing a fluid to the conductor layer. At step S8 a cover layer is provided.

A substrate comprising a micro-voided synthetic polymer may be manufactured in a number of ways. One way is by bi-axially extruding a blend of a first and a second polymer. A first polymer, in an example a linear polyester, is provided as a continuous phase. A second polymer, in an example an amorphous polymer having a high molecular weight, is dispersed substantially uniformly throughout the first polymer. The second polymer has a higher glass transition temperature and/or branching and/or crosslinking, and/or higher melting point than the first polymer. Due to the blend of the first and second polymers, when bi-axially extruded the resultant film is thicker than would be expected for a film comprising the first polymer alone. This is because voids are introduced during the extrusion/stretching process. Once the first polymer cools and hardens, the voids are held in place. The second polymer mixes and flows in a different way to the first polymer and so the blend does not behave like a conventional viscous melt. Whilst the linear polyester portion of the melt flows viscously in a conventional way, the amorphous, high-molecular weight portion, for example SAN, behaves like an elastic component and tries to return the substrate to the original shape. As a result, voids are introduced into the substrate.

Furthermore, during manufacture, internal stresses in the substrate can be relieved by heating the substrate without tension in order to reduce the subsequent tendency for the substrate to buckle, thereby improving the stability of the final substrate.

If an electroconductivity enhancing component, for example a non-dielectric pigment, is introduced to the polymer blend, then the component can enhance the void-forming process by, for example, easing the passage of air into the film. Non-dielectric pigments, further reduce the tendency of the final substrate to take on and hold onto any electrostatic charge, and so electrostatic forces (for example tribocharging) generated in contact printing processes can be dissipated away more readily. Accordingly, the non-dielectric pigments can improve the precision with which ink is printed onto the substrate.

Non-dielectric pigments are typically materials that either by their propensity to dielectric breakdown or their inherent conductivity (which should be neither too low nor too high) allow electrostatic charge to leak away and thereby stop the substrate from behaving like a capacitor. Examples include metal oxides with low, but non zero levels of electrical conductivity.

The void volume for the final film may be estimated by looking at the ratio of the actual thickness of the final substrate to the expected thickness of the substrate. For example, if a 1000 μm thick synthetic polymer film was to be increased in area by a factor of 4 by doubling the length and doubling the width of the film then the expected thickness of the resultant bi-axially extruded film would be expected to be 250 μm in order for the volume of the film to stay constant. If the actual thickness was measured at, for example, 375 μm, then the ratio of the actual thickness to the expected thickness would be 150% and the void volume in the measured film would be just over 33%. In some examples, the void volume is in the range 5%-35%.

The ratio of actual thickness to expected thickness may be in the range 105%-180%. Preferably, the ratio of actual thickness to expected thickness is in the range 110%-150%. More preferably, the ratio of actual thickness to expected thickness is in the range 115%-145%. The expected thickness is the pre-stretched thickness divided by the change in area.

Figure 3:
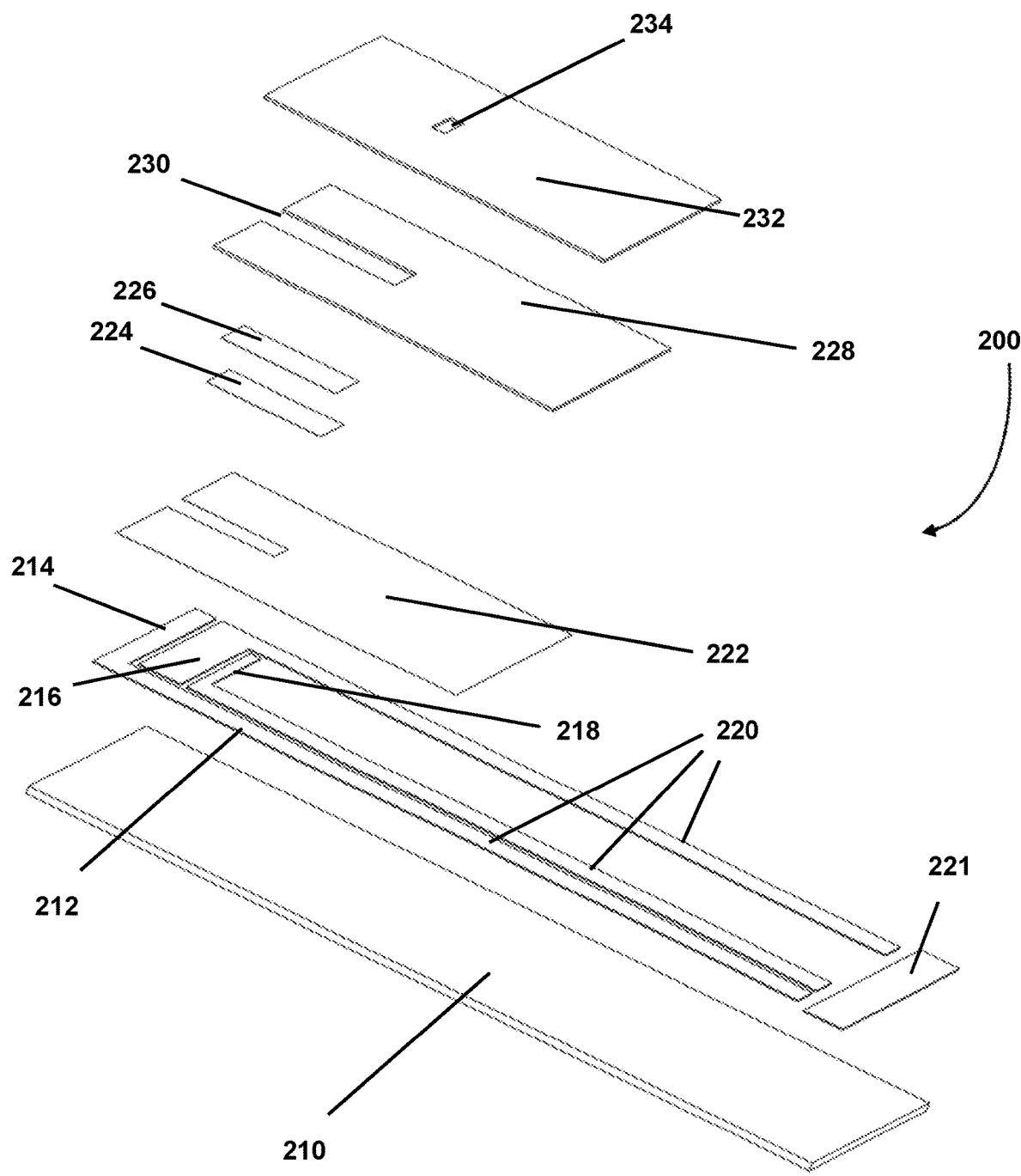
FIG. 3 shows an exploded view of an electrochemical test device.

FIG. 3 shows a perspective, exploded view of an electrochemical test device in the form of electrochemical test strip 200 according to a first example. This example will be described in relation to a received blood sample of around 0.5 μl in volume, although the electrochemical test strip could be used with any suitable fluid sample. In this first example the electrochemical test strip 200 has a coplanar electrode configuration. The electrochemical test strip shown in FIG. 3 has an end-fill configuration i.e. the blood sample can be received at one end of the electrochemical test device 200.

The electrochemical test strip 200 comprises a support layer or substrate 210. The substrate 210 comprises a micro-voided synthetic polymer. The thickness of the substrate is approximately 350 μm. The substrate 210 is thermally and dimensionally stable, with consistent properties such as thickness, surface roughness and surface energy.

Above the substrate 210 is the conductor layer 212. In this example, the conductor layer 212 is directly disposed upon the substrate 210 using a PTF ink. In this example, the conductor layer 212 is printed directly onto the upper surface of the substrate 210. The conductor layer 212 may be printed onto the substrate 210 using screen printing, lithographic printing, tomographic printing, sub-microlitre controlled volume drop on demand printing technologies or any other suitable method of printing. The conductor layer comprises a set of electrodes including working electrode 214, counter/reference electrode 216 and fill-sufficiency detect electrode 218. The conductor layer 212 further comprises a set of conductive tracks 220. In this example, the conductive tracks 220 extend along the longitudinal axis of the electrochemical test strip 200. The conductive tracks are suitable for electrically coupling the electrodes to a meter 12. The conductor layer 212 further comprises a switch-on bar 221 for activating a meter 12.

Above the conductor layer 212 is an insulating layer 222. The insulating layer 222 is made of an electrically insulating material, and is directly disposed upon the upper surface of the conductor layer 212. The insulator layer 222 is, in this example, made of a dielectric material and defines an interaction area. That is, the insulation layer 222 electrically insulates some portions of the conductor layer 212 from the layers situated above in the electrochemical test strip 200. Specially designed gaps in the insulator layer 222 expose some portions of the conductor layer 212 to the layers situated above in the electrochemical test strip 200.

Sensing chemistry is applied to the electrodes of the conductor layer 212. In this example, the sensing chemistry comprises two reagent layers 224 and 226 which are applied to exposed electrode interaction areas after the insulator layer 222 is formed. The reagent layers 224 and 226 coat the exposed electrode interaction areas. In this way, the insulator layer 222 defines which part or parts of the electrodes of the conductor layer 212 are able to come into contact with an applied blood sample for the measurement of the analyte.

Above the insulator layer 222 is a spacer layer 228 formed of a polyester core. The spacer layer 228 defines a sample introduction channel 230, or measurement chamber, for introducing a blood sample to the conductor layer 212. The height of the sample introduction channel 230 is defined by the thickness of the spacer layer 228. The spacer layer 228 is formed of double sided adhesive tape which, in this example, is applied directly to the upper surface of the insulator layer 222. The sample introduction channel 230 is formed by providing a gap into the double sided adhesive tape of the spacer layer 228. The thickness of the spacer layer 228 is approximately 0.1 mm, which provides a good balance between the volume of the sample introduction channel and the performance of the electrochemical test strip 200.

Above the spacer layer 228 is a cover layer 232. During manufacture, the spacer layer 228 and the cover layer 232 may be applied to the test strip 200 separately or as a single prelaminated layer, although in this example the cover layer 232 is a separate layer to the spacer layer 228. The cover layer 232 acts as a ceiling to the sample introduction channel 230, thereby substantially closing the sample introduction channel 230 from above. The cover layer 232 is formed of single sided tape and, in this example, is adhered directly to the upper surface of the spacer layer 228. The lower surface of the cover layer 232 has hydrophilic properties, which assist in drawing a blood sample into the sample introduction channel 230. The cover layer 232 further has a vent 234 suitable for venting air out of the sample introduction channel 230 to allow a blood sample to enter the sample introduction channel 230 via capillary action. The vent 234 is narrower than the sample introduction channel 230 so that air may easily vent from the sample introduction channel 230 but blood or any other fluid will not easily be able to pass through the vent 234.

In use, a fluid sample is provided to the electrochemical test device and a potential difference is applied across the fluid sample to generate a detectable output signal indicative of an analyte concentration in the fluid sample. In this example, in use a blood sample is applied to the sample introduction channel 230 of the electrochemical test strip 200. Through capillary action, the blood is drawn into the sample introduction channel 230 to the electrodes 214 and 216 of the conductor layer 212. That is, the sample introduction channel 230 acts as a capillary channel. A potential difference is applied across the electrodes 214 and 216 and the blood sample, and an output signal such as a transient current is generated from the blood sample. The characteristics of the output signal can be used to determine the concentration of an analyte, such as glucose, lactate, glycerol or a ketone body such as β-hydroxybutyrate, in the blood sample.

Figure 4:
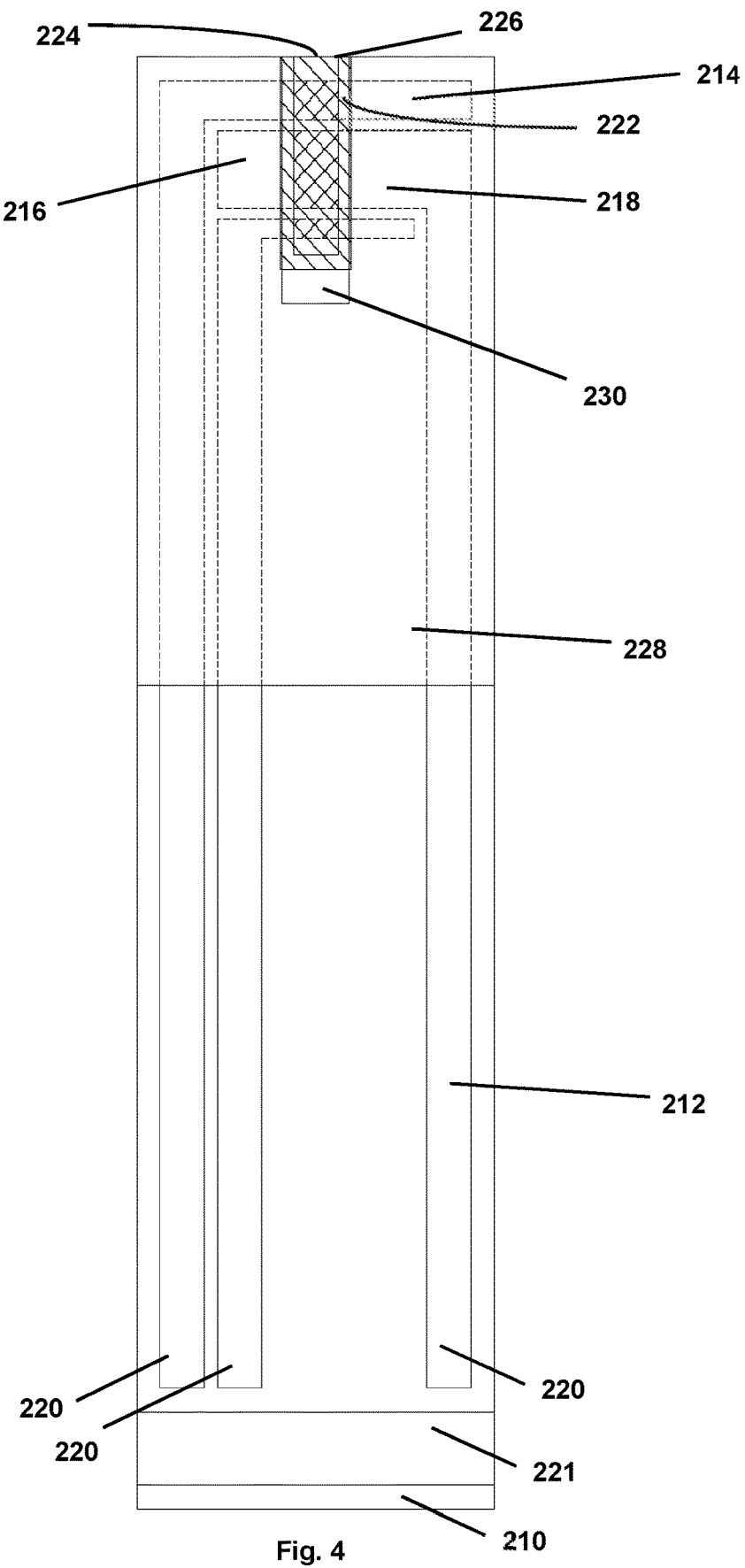
FIG. 4 shows a perspective view of some of the layers of the electrochemical test device shown in FIG. 3.

FIG. 4 depicts a plan view of some of the layers of the electrochemical test strip 200 of FIG. 3. In particular, FIG. 4 shows the substrate 210, the conductor layer 212, the insulator layer 222, the reagent layers 224 and 226, and the spacer layer 228. The cover layer 232 is not shown in FIG. 4 for clarity. The two reagent layers 224 and 226 are applied to the exposed areas of each of the working electrode 214, the counter/reference electrode 216 and the fill-sufficiency detect electrode 218.

In FIGS. 3 and 4 an example of a coplanar electrochemical test device is shown, in which the set of electrodes are provided in a single conductor layer 212. An electrochemical test device comprising a micro-voided synthetic polymer may be a cofacial electrochemical test device, in which one or more electrodes are provided in a first conductor layer, and one or more further electrodes are provided in a second conductor layer, the second conductor layer separated from the first conductor layer. For example, such a cofacial electrochemical test device may comprise a first conductor layer above the substrate layer, and a spacer layer (such as spacer layer 228) above the first conductor layer. A second conductor layer comprising one or more electrodes may be provided above the spacer layer. A cover layer, which may be a second substrate layer, may be provided above the second conductor layer. The second substrate layer may comprise a micro-voided synthetic polymer. Insulator layers may also be provided.

In such a cofacial electrode configuration the first and second conductor layers are in a facing or opposing arrangement across the sample fluid in the sample chamber. The electrodes are coated with sensing chemistry, such as one or more reagent layers, for reacting with one or more analytes in an applied fluid sample.

Aspects of the present disclosure will now be illustrated by way of comparative example.

In the following example, the use of micro-voided synthetic polymer as an alternative to traditional polyester substrates is demonstrated. For notational convenience, the phrase "micro-voided substrate" has hereafter been used to refer to a substrate comprising a micro-voided synthetic polymer. Test strips were screen printed to form electrodes, using a conductive carbon paste, an insulating (dielectric) layer, and a cover layer or lidding tape to form a capillary for application of a fluid sample. The conductive carbon paste was applied to polyester (PET) and micro-voided substrates in parallel, under the same printing condition. Performance was evaluated using a ferricyanide/ferrocyanide solution (145 mM/9.58 mM concentration respectively) in a 100 mM phosphate buffer with pH7.4. Electrodes were formed and tested in a multichannel potentiostat. Current output was recorded for multiple test strips under the same test conditions. The current output was analysed using Minitab, and data presented as a coefficient of variance. From this it was possible to determine the print quality of the carbon, as a measure of variability in the current output.

In particular, in the present example the micro-voided substrate was Synaps OM (Agfa, 450 gsm), which is available from Agfa-Gevaert NV (Morstel, Belgium).

The PET substrate, against which the micro-voided substrate was tested, was Melinex 329, which is available from Teijin DuPont Films Ltd (Tokyo, Japan).

Analysis of the micro-voided substrate was performed alongside the PET substrate. The results are as follows:

Surface Roughness.

All materials were conditioned for a minimum of 16 hours at 23±2° C., 50±5% RH prior to testing.

The tested micro-voided substrate has a higher surface roughness than polyester substrate, although the differences are comparatively small. Often, the smoother the surface, the better the print quality, (as the ink does not need to be pushed through surface "bumps"), but the worse the wettability (due to lower surface area) with all else being equal. As a target, a surface roughness of less than 2 µm would be preferred.

The surface roughness of the substrate was determined using a Proscan 2000A surface profile measuring system. The nominal characteristics of the system satisfy the requirements of BS EN ISO 25178-602:2010.

The average roughness amplitude (Ra) was determined on both sides of the sheet. Ten replicate determinations were made in both the machine and cross-directions using a scan length of 4 mm, a step interval of 0.003 mm and a roughness filter of 0.8 mm.

In the table below, the average roughness of the various substrates is shown in micrometres. As can be seen from the table, the mean surface roughness of both the micro-voided substrate and the polyester substrates are significantly below 2 µm. StDev indicates the standard deviation.

|  | Surface Roughness, Ra (µm) | |
| --- | --- | --- |
| Replicate | Polyester | Micro-voided |
| 1 | 0.32 | 0.89 |
| 2 | 0.34 | 0.96 |
| 3 | 0.31 | 0.96 |
| 4 | 0.33 | 0.82 |
| 5 | 0.32 | 0.93 |
| 6 | 0.31 | 0.74 |
| 7 | 0.32 | 0.85 |
| 8 | 0.32 | 1.01 |
| 9 | 0.36 | 1.02 |
| 10 | 0.33 | 0.91 |
| Mean | 0.33 | 0.91 |
| StDev | 0.02 | 0.09 |

Surface Resistivity

All materials were conditioned for a minimum of 16 hours at 23±2° C., 50±5% RH prior to testing. The surface resistivity of the substrate, was determined in accordance with BS 6524: 1984.

The sample was placed on an insulating base plate, which was in turn rested on an earthed metal plate. A clean electrode assembly, consisting of a cylindrical and an annular electrode concentrically arranged within each other, was placed on top. A voltage of 500V was applied to the electrode assembly and the resistance of the substrate was measured after 15±1 seconds using a teraohmmeter.

Five replicate tests were made on each surface.

The tested micro-voided substrate has lower surface resistivity than the polyester substrate making it less susceptible to static charge. Static charge can be a problem for screen printing, leading to bridging (short circuits) and print definition problems. This lower surface resistivity will account for some of the improvements in print quality achieved compared to a polyester substrate.

In the table below, the mean and standard deviations of measurements of the surface resistivity are shown. In particular, the micro-voided substrate is shown to have a mean topside surface resistivity of around $8.08 \times 10^9$ ohms (Ω), which is significantly lower (~×1000) than the mean topside surface resistivity of the polyester substrate.

| Surface Resistivity ($\Omega$) | | | | |
|---|---|---|---|---|
| | Polyester | | Micro-voided substrate | |
| | Topside | Reverse | Topside | Reverse |
| Mean | $8.48 \times 10^{13}$ | $8.10 \times 10^{13}$ | $8.08 \times 10^{9}$ | $2.42 \times 10^{10}$ |
| StDev | $1.42 \times 10^{13}$ | $9.67 \times 10^{12}$ | $9.88 \times 10^{8}$ | $1.30 \times 10^{9}$ |

Water Drop Contact Angle

Measurements were performed of a water drop contact angle for the micro-voided substrate and for the polyester substrate. The water drop contact angle is the angle, formed between a solid surface and a tangential line drawn through a droplet of liquid placed on the surface at the point where the liquid and surface meet. The water drop contact angle quantifies the wettability of a given solid surface by a specific liquid. Measurement of the contact angle allows for the surface tension of any liquid to be thereby derived when a droplet of liquid is placed upon a surface of known surface energy and roughness. Conversely, it allows the surface energy of a surface to be derived when a droplet of known surface tension liquid (for example pure water) is placed upon a surface with a defined roughness. In this way measurement of contact angle allows the tendency of a particular liquid to 'wet' (i.e stick to) a particular surface (or substrate) to be quantified (with lower contact angles signifying improved wetting of the surface by the liquid). The micro-voided substrate had the highest contact angle, which indicates that it was the least wettable. Accordingly, any conductive inks deposited on the micro-voided substrate will not spread as much as if deposited on a comparable conventional polyester substrate, and accordingly an electrochemical test device comprising a micro-voided substrate will often have better defined electrodes and conductive tracks than a corresponding electrochemical test device having a PET substrate. However, hydrophobic surfaces are generally less favourable in terms of interfacial wetting and subsequent adhesion, but this can be offset by the penetration of the coating layer into the micro-voids which provides enhancement to adhesion via a "keying in" mechanism.

The surface wettability and absorbency of the substrate surface was determined in accordance with ASTM D5946-09 using an automated contact angle tester.

A 5 µl to 8 µl drop of water was applied to the test surface from an applicator. An image of the droplet in contact with the substrate was captured by the apparatus after the droplet had reached its "equilibrium condition" and the contact angle recorded.

Duplicate tests were made on five replicate sheets.

| Contact Angle (°) | | | | |
|---|---|---|---|---|
| | Polyester | | Micro-voided | |
| | Topside | Reverse | Topside | Reverse |
| Mean | 61.9 | 66.1 | 78.1 | 78.5 |
| StDev | 2.52 | 4.62 | 4.42 | 4.98 |

Thermal Stability

Thermal stability is an important consideration for the selection of a substrate as it is important that at a given temperature for drying a conducting or insulating print the substrate will not deform. It is generally recommended to dry carbon for example at temperatures exceeding 170° C. for at least 2 minutes. Accordingly, it is desirable that at temperatures of 170° C. and above there is no substantial change in the dimensions of the substrate due to shrinkage or warping, as this will affect the registration or printability of subsequent layers of the electrochemical test device.

In order to compare a micro-voided substrate with a polyester substrate, a data logger was placed onto samples of the substrates and the samples were placed on a conveyer belt of a conveyer belt dryer. The average substrate temperature and peak substrate temperature were measured for a given dryer temperature setting or set point. Once through the dryer, any changes in card dimension or resistance of the carbon tracks was measured (resistance changes indicate the carbon is not fully dry).

Results for the polyester substrate are shown in the following table and the average and peak temperatures for the polyester substrate are plotted in FIG. 5, where a 'tick' indicates a measured change and a 'cross' indicates no measured change.

| Melinex Polyester Substrate | | | | |
|---|---|---|---|---|
| Dryer Set Point (° C.) | Average Substrate Temperature | Peak Substrate Temperature | Card Dimension Change | Track Resistance Change |
| 170 | 45.9 | 63.5 | x | ✓ |
| 180 | 49.9 | 65.2 | x | ✓ |
| 190 | 50.2 | 68.5 | x | x |
| 200 | 51.3 | 70.1 | x | x |
| 210 | 52 | 73.6 | x | x |
| 220 | 55.4 | 77.3 | x | x |

Results for the micro-voided substrate are shown in the following table and the average and peak temperatures for the micro-voided substrate are plotted in FIG. 6, where a 'tick' indicates a measured change and a 'cross' indicates no measured change.

| Micro-voided Substrate | | | | |
|---|---|---|---|---|
| Dryer Set Point (° C.) | Average Substrate Temperature | Peak Substrate Temperature | Card Dimension Change | Track Resistance Change |
| 170 | 55.3 | 69 | x | x |
| 180 | 62.5 | 76 | x | x |
| 190 | 66.3 | 83 | x | x |
| 200 | 68.4 | 80 | x | x |
| 210 | 75.1 | 91 | x | x |
| 220 | 77.5 | 95 | ✓ | x |

Figure 5:
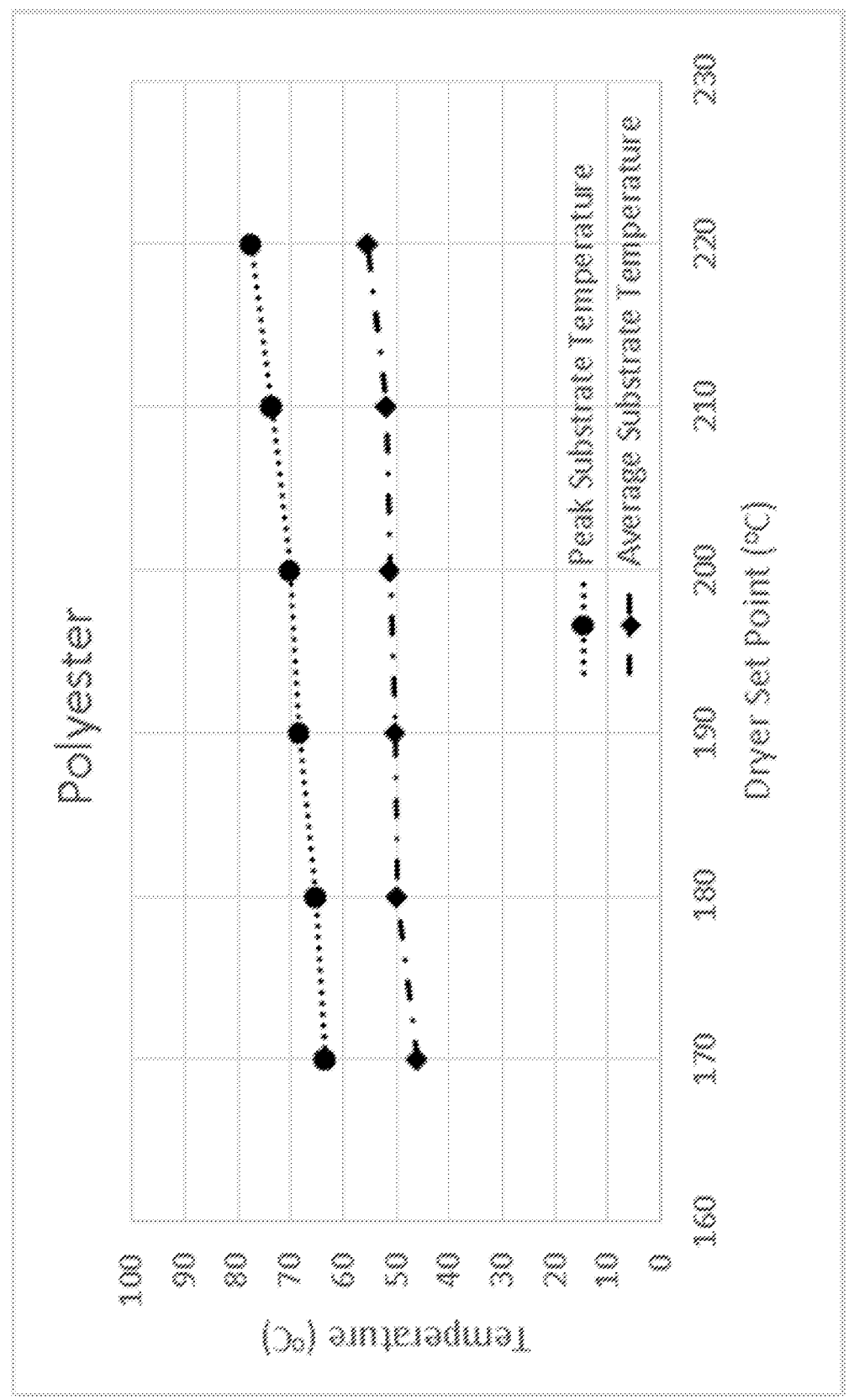
FIG. 5 is a graph showing how peak substrate temperature and average substrate temperature vary with dryer temperature when the substrate is a conventional polyester substrate.
Figure 6:
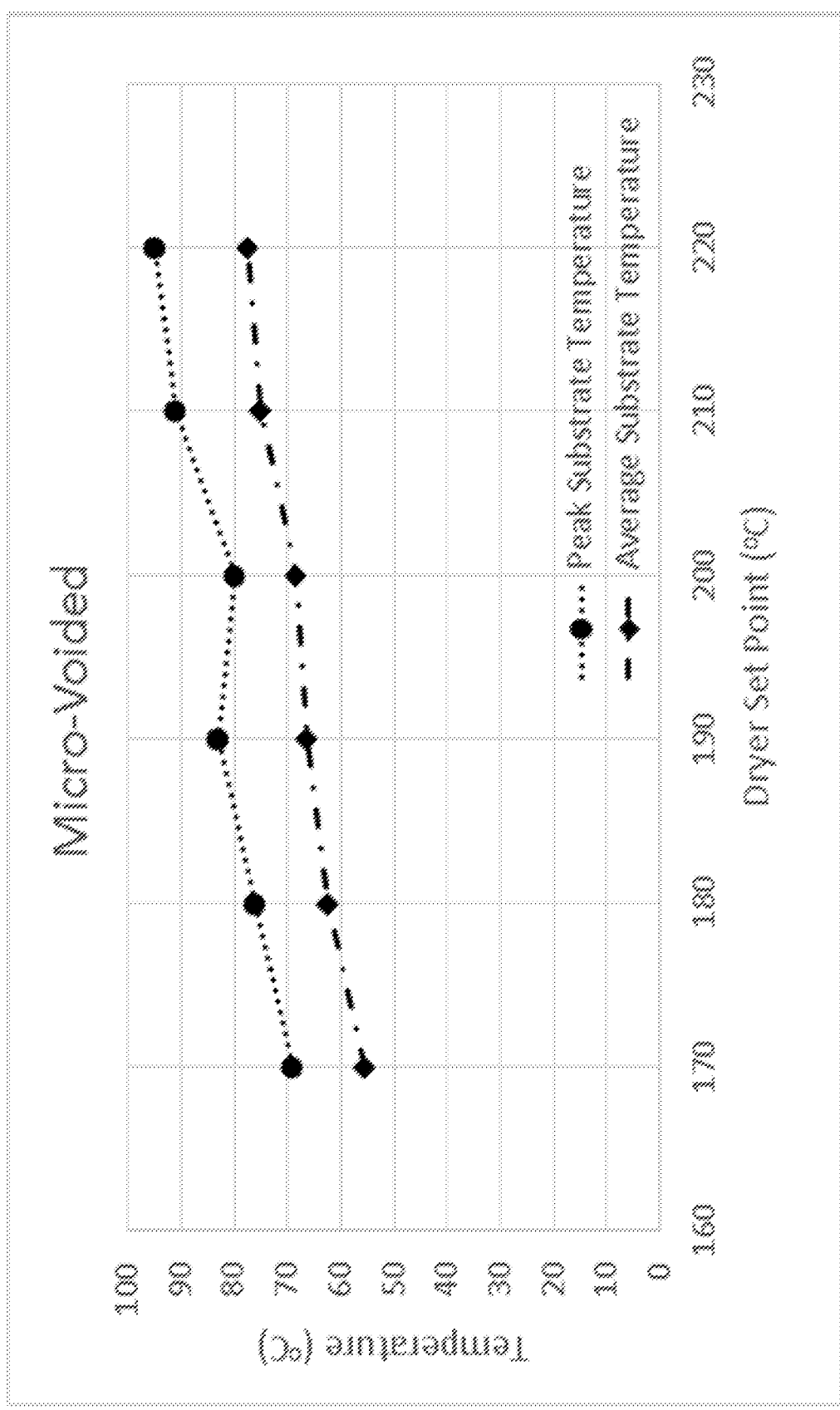
FIG. 6 is a graph showing how peak substrate temperature and average substrate temperature vary with dryer temperature when the substrate comprises a micro-voided synthetic polymer.

As can be seen from the tables and from FIGS. 5 and 6, for a given dryer set point, the average substrate temperature for the micro-voided substrate is greater than the average substrate temperature for the polyester substrate. Accordingly the conductive inks dry quicker on the micro-voided substrate than on the polyester substrate as less of the supplied heat is sequestered in warming the substrate. This is indicated by the fact that, for dryer set points of 170° C. and 180° C. there is a track resistance change for the polyester substrate but not for the micro-voided substrate.

The tables above further show that the polyester substrate is thermally stable at 220° C. but the micro-voided substrate is not. However, in experiments both the polyester substrate and the micro-voided substrate deformed at 230° C.

Coefficient of Variability in Transient Signals

The uniformity of electrochemical test devices comprising electrodes printed onto each substrate type was measured by determining their electrochemical response to an electroactive test solution. Several substrate cards of both the micro-voided variety discussed above and the conventional polyester variety were screen printed with sensor electrode patterns, using the same PTF conductive carbon ink for both varieties of substrate cards. The same manufacturing set up and drying conditions were used for both types of substrate. Active electrode areas were then defined in a subsequent Insulation print step, again alternating substrate type but using the same PTF dielectric ink, print screens, screen printing equipment and settings, and drying conditions throughout. The drying was effected with forced air at a temperature of 180 C, in a tunnel oven with a dryer path length of 2 metres, a belt speed of 0.7 m/min, for a duration of approximately 3 minutes.

Once assembled, electrochemical test devices were tested on a multi-potentiostat. In particular, after application of a known sample, 0V were applied across the working and counter/reference electrodes of each strip for 2 seconds, followed by 300 mV for 8 seconds. An output signal, in particular a transient current, was generated. The data for the transient current was sampled and analysed at 5 seconds.

Both substrate types were dried under the same conditions of 180° C. on a belt dryer set to run at 0.7 m/min. The polyester is thermally more stable than the micro-voided substrate, up to 220° C., but the micro-voided substrate showed good thermal resistance at 180° C. This was shown to be high enough to dry the conductive carbon containing layer with one pass. Carbon drying was determined by measuring the resistance of a region of the carbon print after sequential passes through the dryer. Once there was no change in measured carbon resistance the conductive carbon layer was deemed to be dry.

Figure 7:
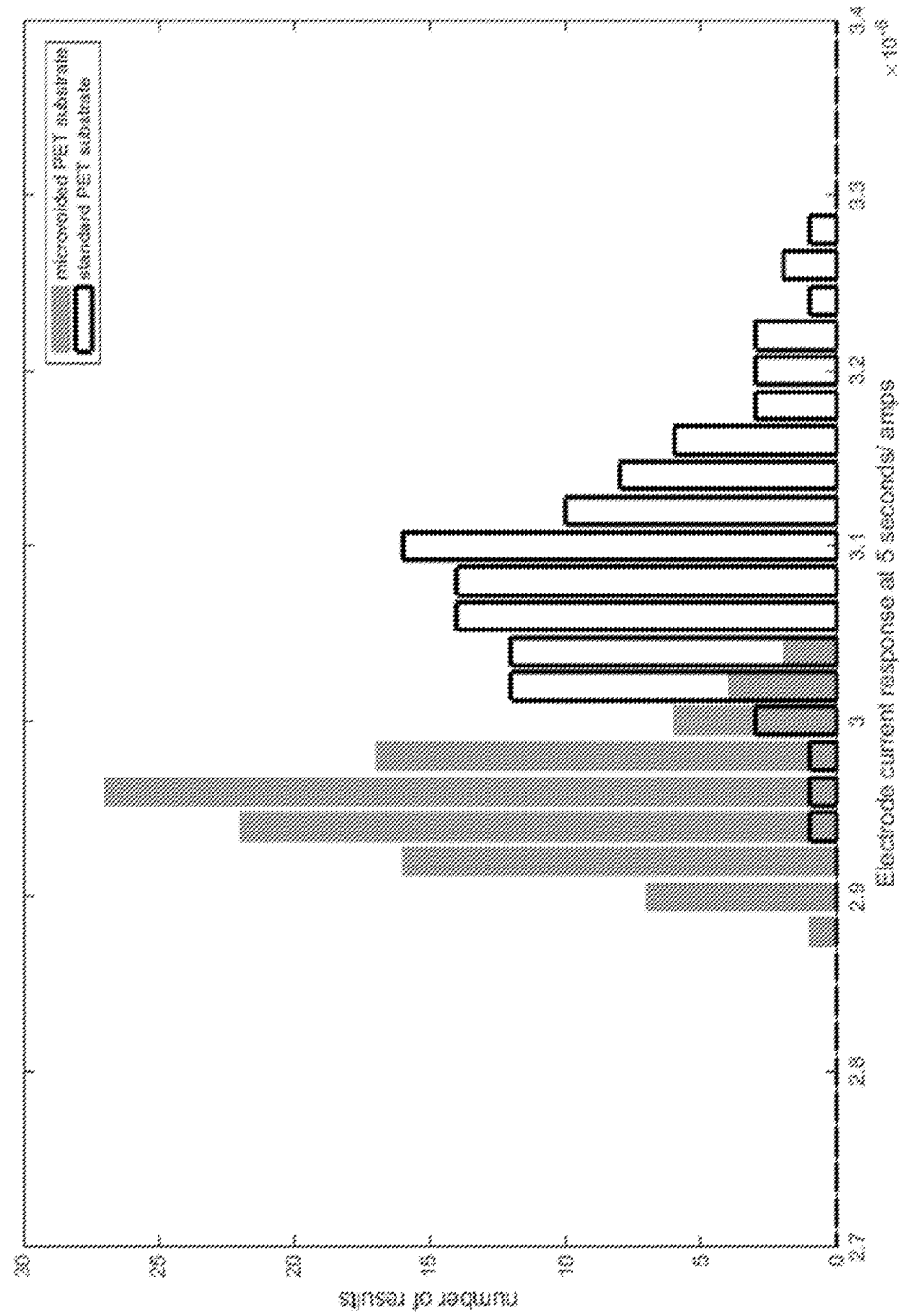
FIG. 7 is a histogram showing the current response from electrodes printed on a PET substrate and electrodes printed on a micro-voided substrate.

FIG. 7 is a histogram of the current response from approximately 100 electrochemical test devices having electrodes printed onto each substrate type. In particular, FIG. 7 shows the electrode current response of 111 electrochemical test devices on PET substrate and the electrode current response of 102 electrochemical test devices on micro-voided substrate. The mean current response for the PET substrates was 3.093 µA with a standard deviation of 0.064 µA. The mean current response for the micro-voided substrates was 2.955 µA with a standard deviation of 0.033 µA. The coefficient of variation (CV) of the standard PET substrates was 2.07%. The coefficient of variation of the micro-voided substrates was 1.1%.

As a test of significance, a Kruskal-Wallis test for the distribution was performed. The p-value was $3.37 \times 10^{-34}$. The null hypothesis of the Kruskal-Wallis test was rejected. Accordingly, the current response distribution for electrochemical test devices having the PET substrates is different from the current response distribution for electrochemical test devices having the micro-voided substrate.

As described above, different substrates have different properties affecting printability. The mean current response for the micro-voided substrate is slightly lower than the mean current response for the PET substrate. In experiment, the ink on the PET substrate did not stay in place (i.e. print definition of printed features was lost) and accordingly the resultant printed electrodes were around 0.5% bigger than the planned electrode design. In contrast, on the micro-voided substrate the deposited ink stayed in place (i.e. print definition of printed features was maintained). Accordingly, the mean current response from electrochemical test devices having a micro-voided substrate was very slightly less than that for devices having a PET substrate, but with far more consistency in current response.

An electrochemical test device having a substrate comprising a micro-voided synthetic polymer may be manufactured according to the following example. Firstly, conductive PTF carbon ink is screen printed onto a micro-voided synthetic polymer substrate. A dielectric PTF ink is then screen printed over the conductor layer to define an interaction area for the working electrode(s) of the conductor layer. Both the conductor layer and the insulator layer are dried, for example in a forced air tunnel drier. Functional reagent inks for interacting with an analyte in a received sample, are deposited over the electrodes by screen printing or drop-on-demand deposition, and dried in a forced air tunnel drier. A spacer layer, for example an adhesive backed hydrophilic capillary spacer, is laminated over the printed electrodes to create a sample chamber above the electrodes that can be filled with sample by capillary action. The electrochemical test device may be placed into an air tight, desiccated opaque and light fast vial for stable preservation until needed for use.

Variations of the described embodiments are envisaged, for example, the features of all the disclosed embodiments may be combined in any way.

For example, an electrochemical test device may contain more layers than those disclosed in the preceding description. For example, an electrochemical test device may further comprise one or more bonding layers for bonding together one or more of the layers disclosed above. Additionally, some of the layers are not always necessary. For example, the insulator layer may be absent from the examples discussed above. The spacer layer may define the interaction area of the electrodes of the conductor layer beneath. The spacer layer may perform the dual role of receiving a fluid sample through a capillary channel and defining an interaction area for combining the fluid sample with the conductor layer. For example, the spacer layer can, with appropriate adhesive, define the active area/interaction area of the electrodes.

In the examples of the electrochemical test device discussed above, a layer structure has been shown. The order in which each of the layers is formed may vary and any layer may, in some way, be configured so as to be in contact with any other layer.

The fluid sample may be a biological fluid. For example, the biological fluid may be blood, interstitial fluid, plasma, sweat, urine, lachrymal fluid, saliva or breath condensate.

The one or more analytes of interest may be any analyte(s) found in the fluid sample. For example, the analytes may be one or more of glucose, lactate, glycerol, cholesterol, or a ketone body such as β-hydroxybutyrate.

The electrochemical test device may be any suitable electrochemical test device. The electrochemical test device may be a test strip. In some examples the electrochemical test device may comprise a patch. Electrochemical test devices such as patches typically comprise a subcutaneous fluid extraction set and sensing chemistry for interaction with the one or more analytes. The electrochemical test device may be a monitoring component which transmits an output signal to a separate device such as a meter, either wirelessly or through a wired connection. The electrochemical test device may comprise a continuous monitoring device or a semi-continuous monitoring device.

The electrochemical test device may be suitable for testing for multiple analytes or biometrics. For example, the conductor layer may comprise a number of working electrodes, each working electrode featuring different sensing chemistry for detecting a different analyte. In particular, for each analyte there may be a dedicated working electrode of the conductor layer coated in a particular reagent suitable for reacting with the analyte.

In the examples discussed above in relation to FIG. 3, the electrochemical test device had an end-fill configuration. In other embodiments, an electrochemical test device has a side-fill configuration i.e. the fluid sample is received at the side of the electrochemical test device.

The electrochemical test device may be suitable for measuring any fluid sample volume and may be of a suitable corresponding size for the volume. For example the electrochemical test devices described in relation to FIG. 3 was arranged to receive approximately 0.5 µl of blood. The electrochemical test device may be scaled so as to receive other volumes including, for example, between 0.5 µl and 5 µl of a fluid, or between 0.5 µl and 1 µl of a fluid. The electrochemical test device may be scaled so as to receive less than 0.5 µl of a fluid, for example around 0.2 µl or around 0.3 µl.

Although in the discussion above in relation to FIG. 3 a fill-sufficiency detect electrode 218 was present, the fill-sufficiency detect electrode need not be present. Additionally, the fill-sufficiency detect electrode may or may not be coated in one or more reagent layers.

In the discussion above, the substrate comprises a micro-voided synthetic polymer. The substrate may be Synaps OM described above. The substrate may be formed of Polyart®, Teslin® (including biodegradable variants), Yupo, MXM®, ProPrint®, Dupont Tyvek®, MDV Robuskin®. The substrate may comprise any micro-voided synthetic polymer.

The substrate may further comprise inorganic opacifying pigments, whitening agents, colorants, UV-absorbers, light stabilizers, antioxidants and/or flame retardants.

The substrate may have a thickness from approximately 20 µm to approximately 2000 µm. Preferably, the substrate may have a thickness from approximately 100 µm to approximately 700 µm. More preferably, the substrate may have a thickness from approximately 200 µm to approximately 450 µm. More preferably, the substrate may have a thickness of around 350 µm.

In the examples provided above, the conductor layer and the insulator layer are printed layers. The conductor layer and the insulator layer may be supplied using any suitable manufacturing technique. These include forms of printing, for example, screen printing, lithographic printing or tomographic printing. The conductor layer and the insulator layer need not be provided in the same way. Other suitable manufacturing techniques include etching, and/or sputtering, laser scribing, chemical vapour deposition or physical vapour deposition.

A conductor layer may be formed of any suitable conductor. For example, the conductor layer may be formed from a polymer thick film ink. The conductor layer may be formed from a carbon based paste, such as a carbon/graphite paste, including graphene. The conductor layer may be formed of one or more metal based paste such as a gold, platinum or silver paste. Although the conductor layer 212 described above in relation to FIG. 3 comprises a PTF ink, other conductive inks may be used. The electrodes may be formed of silver (Ag) or silver/silver chloride (Ag/AgCl). In some examples, the electrodes are formed of different conducting materials. The one or more working electrodes may, for example, be formed of carbon based ink whereas the counter/reference electrode may be formed of silver (Ag) or silver/silver chloride (Ag/AgCl).

The conductor layer may be of any suitable thickness. For example, the conductor layer may have a thickness greater than or equal to 0.005 mm and less than or equal to 0.030 mm.

The ordering of the electrodes on the electrochemical test device may be altered for efficiency. In one preferable option, an electrode for an analyte for which a weak signal is expected (for example β-hydroxybutyrate or glycerol which is often present in very low concentrations in blood) may be positioned closer to the entrance of the sample introduction chamber than an electrode for an analyte such as glucose or lactate which is usually present in higher concentrations.

The sensing chemistry may comprise one or more reagents. The sensing chemistry may comprise an analyte-sensitive reagent for interacting with the analyte of interest. For example, the sensing chemistry may comprise an oxidase for interacting with the analyte, or a nicotinamide adenine dinucleotide ($NAD^+$)-dependent dehydrogenase, or a flavin adenine dinucleotide (FAD)-dependent dehydrogenase, or a pyrroloquinoline quinone (PQQ)-dependent glucose dehydrogenase. The sensing chemistry may comprise the required cofactors.

The sensing chemistry may comprise an electron transfer agent or mediator for facilitating the transfer of electrons between the analyte of interest and the electrode(s) of the electrochemical test device. Any suitable mediator may be used. For example, the mediator may comprise potassium ferricyanide, or ruthenium hexaammine trichloride, or ruthenium pentaammine chloride. The mediator may comprise a naphthoquinone derivative.

The sensing chemistry may comprise a diaphorase. The diaphorase may be any suitable diaphorase. For example, the diaphorase may be an NADPH:acceptor oxidoreductase (NADPH dehydrogenase of the class EC 1.6.99.1). The diaphorase may be an NADH:acceptor oxidoreductase (NADH dehydrogenase of the class EC 1.6.99.3). The diaphorase may be an NADH:(quinone acceptor) oxidoreductase (NADH dehydrogenase (quinone) of the class EC 1.6.99.5).

In the examples above, the sensing chemistry is applied to each of the working electrodes as two reagent layers. There may be more than two reagent layers for each working electrode. There may be only one reagent layer for each working electrode.

The insulator layer may be formed of any suitable insulating material. For example, dielectric/insulation inks may be polymer loaded inks that are thermoplastic, thermoset or UV cured and that, when dried or cured, form a contiguous non-conductive layer. Examples include, Loctite EDAG PF 021 E&C and DuPont 5018. The insulator layer may be formed using a PTF ink. Any suitable PTF ink, such as a dielectric PTF ink may be used.

The spacer layer may be formed of any suitable material. For example, the spacer layer may be made from a polyester core with a thin layer of PSA (Pressure Sensitive Adhesive) on either side. These adhesives can be the same or different depending on which layer is to be adhered to which side of the spacer layer.

Although in the examples above the thickness of the spacer layer was 0.1 mm, the thickness may vary. A typical range for the spacer layer thickness is 0.05-0.30 mm. Lower thicknesses may affect sensor performance and higher thicknesses would increase the volume of the sample introduction channel. A thickness of an adhesive on the spacer layer may contribute to the rigidity of the spacer layer.

Typically a spacer layer has a high volume resistivity. For example the volume resistivity may be greater than $1\times10^9$ $\Omega$cm.

Other variations of the spacer layer are envisaged.

The sample introduction chamber may be provided along the longitudinal axis of the electrochemical device. The sample introduction chamber may be provided along the transverse axis of the electrochemical test device.

The vent may be of any suitable configuration for venting air from the sample introduction chamber. For example, the vent may comprise an air passageway in the cover. The vent may comprise an air passageway in the spacer layer. Optionally, air may be vented from the sample introduction chamber through one or more air passageways below the spacer layer, such as through the conductor layer or the insulator layer.

While the electrochemical test device described above in relation to FIGS. 3 and 4 was an example of a coplanar electrochemical test device, wherein a set of electrodes is formed in the same conductor layer of the electrochemical test device, the skilled person would appreciate that the disclosures described above could be applied to a cofacial electrochemical test device, in which one or more electrodes are formed in a first conductor layer, and one or more electrodes are formed in a separate conductor layer, and the first conductor layer is separated from the second conductor layer, for example by a spacer layer and/or one or more insulator layers.

Whilst the above examples have been described primarily in the context of an electrochemical test device for measuring a concentration of an analyte in a bodily fluid, it may equally be used in other fields, for example in health and fitness, food, drink, bio-security applications and environmental sample monitoring. The examples described herein may equally be used in the context of animal/veterinary medicine and fitness (including dogs and horses).

The above embodiments have been described by way of example only, and the described embodiments are to be considered in all respects only as illustrative and not restrictive. It will be appreciated that variations of the described embodiments may be made without departing from the scope of the invention.

The invention claimed is:

1. An electrochemical test device for determining the concentration of an analyte in a fluid sample, wherein the electrochemical test device has a substrate comprising a micro-voided synthetic polymer, wherein the synthetic polymer comprises a polyester polymer and the polyester polymer comprises a polyester/SAN polymer combination.

2. An electrochemical test device according to claim 1, wherein the micro-voided synthetic polymer is a micro-voided axially stretched polymer film, optionally wherein the micro-voided synthetic polymer is a micro-voided bi-axially stretched polymer film.

3. An electrochemical test device according to claim 1, wherein the substrate comprises an opacifying pigment.

4. An electrochemical test device according to claim 1, wherein the substrate comprises print receiving chemistry, optionally wherein the print receiving chemistry is provided as a layer.

5. An electrochemical test device according to claim 1 wherein the substrate comprises at least one antistatic agent, optionally wherein the at least one antistatic agent is provided as a layer.

6. An electrochemical test device according to claim 1, wherein:

the substrate has a surface roughness of less than 2 µm; and/or the substrate has a topside surface resistivity in the range of $5\times10^5$ $\Omega$ to $5\times10^{11}$ $\Omega$; and/or the substrate has a topside water drop contact angle of between 74 and 82 degrees.

7. An electrochemical test device according to claim 1, wherein the substrate is thermally stable at an air temperature of around 210° C.

8. An electrochemical test device according to claim 1, the electrochemical test device comprising:

a conductor layer above the substrate, the conductor layer comprising a set of electrodes;

a spacer layer above the conductor layer, the spacer layer defining a sample introduction channel for introducing the fluid sample to the set of electrodes; and a cover above the spacer layer for covering the top of the sample introduction channel.

9. An electrochemical test device according to claim 8, further comprising an insulator layer above the conductor layer, optionally wherein the insulator layer comprises a polymer thick film, PTF, ink.

10. An electrochemical test device according to claim 8, wherein the conductor layer comprises a polymer thick film, PTF, ink.

11. An electrochemical test device according to claim 1, the electrochemical test device comprising:

a conductor layer above the substrate, the conductor layer comprising at least one electrode;

a spacer layer above the conductor layer; and a second conductor layer above the spacer layer, the second conductor layer comprising at least one electrode;

wherein the spacer layer defines a sample introduction channel for introducing the fluid sample to the at least one electrode of the conductor layer and to the at least one electrode of the second conductor layer.

12. An electrochemical test device according to claim 11, further comprising a cover layer above the second conductor layer, optionally wherein the cover layer is a substrate comprising a micro-voided synthetic polymer.

13. A method of manufacturing an electrochemical test device for determining the concentration of an analyte in a fluid sample, the method comprising:

using a micro-voided synthetic polymer as a substrate of the electrochemical test device, wherein the synthetic polymer comprises a polyester polymer and the polyester polymer comprises a polyester/SAN polymer combination.

14. A method according to claim 13, wherein the method further comprises:

providing a conductor layer above the substrate to form at least one electrode of the electrochemical test device.

15. A method according to claim 14, wherein the conductor layer is a carbon containing layer and the providing the conductor layer comprises depositing a carbon containing layer on the substrate to form the at least one electrode.

16. A method according to claim 15, the method further comprising drying the deposited carbon containing layer with an air temperature of between 170° C. and 210° C.

17. A method according to claim 14, wherein the drying of the carbon containing layer is performed for at least 2 minutes.

18. A method according to claim 14, further comprising either:

providing a spacer layer above the conductor layer; and providing a cover above the spacer layer; or providing a spacer layer above the conductor layer; and
providing a second conductor layer above the spacer layer, the second conductor layer comprising at least one electrode, optionally further comprising:
  providing a cover layer above the second conductor layer.

* * * * *